(12) United States Patent
Bryan et al.

(10) Patent No.: US 6,658,414 B2
(45) Date of Patent: Dec. 2, 2003

(54) METHODS, SYSTEMS, AND COMPUTER PROGRAM PRODUCTS FOR GENERATING AND PROVIDING ACCESS TO END-USER-DEFINABLE VOICE PORTALS

(75) Inventors: Edward Lee Bryan, Durham, NC (US); David Tracy Bennett, Chapel Hill, NC (US); Raymond Leo Idaszak, Apex, NC (US); Suresh Balu, Carrboro, NC (US)

(73) Assignee: Topic Radio, Inc., Durham, NC (US)

(*) Notice: Subject to any disclaimer, the term of this patent is extended or adjusted under 35 U.S.C. 154(b) by 201 days.

(21) Appl. No.: 09/800,371

(22) Filed: Mar. 6, 2001

(65) Prior Publication Data

US 2002/0146015 A1 Oct. 10, 2002

(51) Int. Cl.[7] .............................................. G06F 17/30
(52) U.S. Cl. ........................ 707/9; 704/270; 704/275; 379/88.01; 379/88.02
(58) Field of Search ................ 707/1, 9; 704/270–275; 379/88.01, 88.02

(56) References Cited

U.S. PATENT DOCUMENTS

| | | | |
|---|---|---|---|
| 5,754,939 A | | 5/1998 | Herz et al. |
| 5,799,151 A | * | 8/1998 | Hoffer ........................ 709/204 |
| 5,819,220 A | * | 10/1998 | Sarukkai et al. ......... 704/270.1 |
| 5,915,001 A | | 6/1999 | Uppaluru |
| 5,956,298 A | * | 9/1999 | Gough ..................... 369/29.01 |
| 5,987,454 A | * | 11/1999 | Hobbs ............................ 707/4 |
| 6,012,087 A | | 1/2000 | Freivald et al. |
| 6,018,710 A | * | 1/2000 | Wynblatt et al. ............ 704/260 |
| 6,047,327 A | | 4/2000 | Tso et al. |
| 6,049,796 A | | 4/2000 | Siitonen et al. |
| 6,061,718 A | | 5/2000 | Nelson |
| 6,081,705 A | * | 6/2000 | Houde et al. ................ 455/411 |
| 6,154,727 A | * | 11/2000 | Karp et al. ..................... 705/3 |
| 6,157,924 A | | 12/2000 | Austin |
| 6,188,985 B1 | * | 2/2001 | Thrift et al. ................. 704/275 |
| 6,199,076 B1 | * | 3/2001 | Logan et al. ............. 715/501.1 |
| 6,332,154 B2 | * | 12/2001 | Beck et al. .................. 709/204 |
| 6,363,337 B1 | * | 3/2002 | Amith ............................ 704/7 |
| 6,400,806 B1 | * | 6/2002 | Uppaluru ................. 379/88.02 |
| 6,408,272 B1 | * | 6/2002 | White et al. ............. 704/270.1 |
| 6,456,974 B1 | * | 9/2002 | Baker et al. ............. 704/270.1 |
| 6,501,832 B1 | * | 12/2002 | Saylor et al. ............. 379/88.04 |

OTHER PUBLICATIONS

"Audio Web 1–732–WEB–2000," http://www.cs.rutgers.edu/Audio_Web/, pp. 1–4, Apr. 1998.*
"VoxML Markup Language," http://www.oasis–open.org/cover/voxML.html, pp. 1–4, Jan. 2001.*
"Now This is a Dial–Up," http://www.wired.com/news/technology/0,1282,15339,00.html, pp. 1–2, Sep. 1998.*
Hemphill et al., "Surfing the Web by Voice," Multimedia, p. 215–222, (Apr. 20, 1995).

(List continued on next page.)

Primary Examiner—Safet Metjahic
Assistant Examiner—Hanh Thai
(74) Attorney, Agent, or Firm—Jenkins, Wilson & Taylor, P.A.

(57) ABSTRACT

A method and system for creating, using, and updating individual user voice portals in a multi-user environment is disclosed. Each user selects data sources, keywords and time intervals for searching the data sources, and grammar for accessing search results. Based on this information, an individual voice portal is created for the user. The requested information is extracted from the specified data sources and cached or stored in a database to increase extraction speed. The user accesses the individual voice portal using a unique identifier assigned to the user and the selected grammar. Because each user has a unique voice portal, the search space for software that interprets the grammar is decreased. As a result, the likelihood of misinterpretation and the time for extracting the requested information are decreased.

44 Claims, 8 Drawing Sheets

OTHER PUBLICATIONS

NAHM, "Speech Recognition Makes Using the Internet Easier Than Ever," Verbex Voice Systems, (Sep. 12, 1996).
http://www.heyanita.com, Web Page Printout, (Believed to be no earlier than 2000).
http://www.zerocast.com, Web Page Printout, (Believed to be no earlier than 2000).
http://www.tellme.com, Web Page Printout, (Believed to be no earlier than 1999).

* cited by examiner

METHODS, SYSTEMS, AND COMPUTER PROGRAM PRODUCTS FOR GENERATING AND PROVIDING ACCESS TO END-USER-DEFINABLE VOICE PORTALS

TECHNICAL FIELD

The present invention relates generally to voice portals. More particularly, the present invention relates to methods, systems, and computer program products for generating and providing efficient access to end-user-definable voice portals.

BACKGROUND ART

With the proliferation of the Internet and intranets, there has been an increasing demand for the creation of voice portals. As used herein, the term "voice portal" refers to an audio interface that allows an end user to search and access information using primarily spoken commands. The information accessed through a voice portal may be delivered to the user in a variety of formats, including audio format.

One problem with voice portals is that unlike traditional Internet or Web portals, voice portals present information to the user in a serial, one-dimensional format. There is no ability to scan ahead. Thus, organizing information into topics with specific sources and content therein becomes important.

Scanning a Web page visually is a two-dimensional phenomenon in that the surface of a computer monitor or similar display device is two-dimensional and can be visually scanned in both the horizontal and vertical directions with great visual and comprehensive efficiency. A user can use visual perception to look for underlined text or text of a different color. The user can access this text by clicking on the text using an input device while perceptually discarding and paying no attention to all the other information on a visual Web page. In contrast, there is no such analogy in delivering HTML or similar information to a user in audible format only. When the user is listening to information, the user does not know if a "link" is coming up or if the user desires or does not desire to hear the upcoming information. Thus, a problem with conventional voice portals is an efficient way to allow users to create such portals and efficiently navigate audible information using such portals.

One particular problem encountered in serially oriented content delivery, such as the audible delivery from a voice portal, is that of searching. If the user submits the term "cardiology" arbitrarily to a search engine driving a voice portal that utilizes the entire Internet as a data source, the number of "hits" would preclude the efficient and practical navigation of the numerous results in an audible manner. Thus, there exists a need for the simplification of full-text searching in the context of voice portal audible navigation and delivery.

Furthermore, voice portals today, by their method of implementation, are limited to a offering a finite or fixed vocabulary or grammar, meaning that a typical voice portal may have a finite number of words, e.g., 50, 100, or 500 words, that the voice portal understands and that the entire user base shares. These vocabularies are not extensible; i.e., the user cannot define arbitrary words or grammar. In addition, the user cannot define arbitrary links to the source of information that is to be associated with the user-defined words. Accordingly, another problem with conventional voice portals is to provide a solution for creating extensible voice portals that can be rapidly created and that are unique from one user to the next.

The need for rapid creation of user-defined grammar and source data associations can be thought of as analogous to the need for bookmarks in a visual Web environment. A bookmark is an association between user-defined text and a Web page that can be rapidly created using a conventional Web browser. Each user typically has his or her own set of bookmarks. A corresponding need exists in the voice portal environment whereby a user can define a word or utterance and rapidly associate this word or utterance with information accessible via a voice portal. The action of speaking the word would be analogous to the Web action of selecting a bookmark.

While voice portals are a relatively new phenomenon, there are currently three solutions emerging in the marketplace to the problem of creating an operational voice portal. Each of these problems is briefly discussed below with examples. The discussion of each solution is divided into two parts: what the voice portal solution offers and how one goes about implementing it.

1. The first solutions are those that merely offer predefined keyword choices and predefined categories of services (restaurants, sports, stocks, etc.) to the end user. An example of one such solution can be accessed through www.tellme.com or 1-800-555-TELL. These voice portal solutions are provided by service-oriented companies (as opposed to product-oriented companies). The service these companies offer is a voice portal implemented typically as a toll-free phone number which the user dials, and then is requested to choose between predetermined categories of information such as stock reports, weather reports, etc. The user then utters various predefined commands to access the standard services. For example, the user might say "weather" and then receive, in audible format via a telephone handset, the forecast for the user's geographic area. The user might say "C" "S" "C" "O" to receive the current stock quote for the company Cisco Systems whose symbol is "CSCO." It must be emphasized that the company or service provider chooses the words that will be available to the user, such as "weather", "stocks", or the English alphabet "A" through "Z", for the purpose of inputting specific stocks. At no time is the user allowed to define his or her own words such as "cardiology" or the data with which a word or series of words is associated.

2. System integration companies that can add or integrate a voice portal solution for a client company for a fee represent the second category of solutions. These companies leverage off-the-shelf software/hardware and their own systems integration expert personnel with much "know how" on how to put it together. A good example of a system integration company offering the ability to implement a voice portal for a client is Nortel Networks. The difference between this type of solution and the first solution (1) described above is that this solution gathers the client's customer requirements in the form of the words that the client desires to be part of the voice portal system vocabulary, builds a system to this specification, and then hosts the voice portal solution for a monthly fee. In this solution, the client company can add a word like "cardiology" to the existing vocabulary by making a formal request to Nortel Networks. Nortel Networks then uses its experts to add this to the voice portal system vocabulary. After the word has been added, a user can access the voice portal speak via a telephone, speak the new word, such as "cardiology", and access the information provisioned for that word. However, like solution (1) above, there is no easy solution for end users to define their own words or data associations once the system is up and running. Rather, the addition of new words to the voice portal vocabulary is done through an expensive and time-consuming process of the client company utilizing the expertise of the system integrator under contract to implement, enhance, and host the client company's voice portal. Expertise in VXML and database languages would be essential.

3. A third group of voice portal solutions is provided by system integration companies that go into a client company and add/integrate a voice portal solution for that company for a fee. These companies also have commercial tools they have developed to greatly speed the time of implementation of voice portals. These companies differ from the (2) vendors above in that these tools allow rapid customization at the time of implementation by leveraging a custom tool suite. However, once the customization is done, it is "cast in stone" so-to-speak in that whatever the system is at the time of implementation, this is all of the functionality the users will get when they use the system. In other words, like solutions (1) and (2) above, at no time are the users themselves allowed to define their own words and/or data associations. The difference between solution (3) and solutions (1) and (2) is that the system integration company responsible for implementing the voice portal in solution (3) can more quickly add additional words, but at best this might take days.

The best that can be offered by the above three solutions is to receive information from the user and to provide predefined categories of information using predefined categories. For example, a conventional voice portal system may receive geographic information from the user and provide restaurant choices, or weather for the city in which the user lives. Another example of a predefined service is the ability to obtain stock quotes using predefined vocabulary words for each company. Some customization is possible. For example, the user may be able to access the stocks in his or her portfolio using a predefined "favorites" keyword provided by the system. However, it is very important to understand that these systems only allow the user to customize within the fixed, finite, static and unchanging vocabulary of words programmed into the voice portal at the time it was implemented. For example, in order to provide access to stock quotes, most voice portal systems have twenty-six "words" that the system understands, which are in fact the letters of the English alphabet "A" through "Z." This allows the user to articulate symbols for all stock market stocks by speaking the individual letters. The user can even set up a portfolio of stocks to monitor using these predefined letters. However, the user can never add his or her own word, such as "airplane" or "cardiology." Conventional voice portal systems only allow end user vocabulary or data customization using a limited set of predefined choices. For example, if a user wants to continuously check medical news from a predetermined source, such as the New England Journal of Medicine, within a predetermined time interval (e.g., the last three months), there is no way for the end user to "tell" or "program" conventional voice portal systems to do this. Either the capability was put into the voice portal system by the systems integrator when the voice portal was implemented or last updated, or it was not. Thus, there exists a need for voice portal systems that facilitate end user generation and modification of the voice portal after the voice portal has been established.

Another problem that exists with conventional voice portal is non-homogeneity. For example, a user may utilize a conventional voice portal, such as the voice portal offered by www.tellme.com, to access his or her stocks using the predefined vocabulary word "stock quotes" from the grammar recognized by that voice portal. On a different voice portal, such as the voice portal offered by www.heyAnita.com, the user may access stock quotes using a different predefined vocabulary word, such as "stocks", from the grammar recognized by that voice portal. Such non-homogeneity can make remembering the different predefined grammar sets to use when accessing different voice portals difficult. Accordingly, there exists a need for methods and systems for providing homogeneity among voice portal grammar sets.

DISCLOSURE OF THE INVENTION

The present invention solution overcomes these limitations and difficulties associated with conventional voice portals. Specifically, the present invention overcomes two major problems of conventional solutions that prevent voice portals from being efficient and extensible in a manner analogous to Web portals:

(a) Conventional voice portal solutions have finite vocabularies and data sets that are not user-definable and/or user-extensible; and (b) The effort to add additional vocabulary to conventional voice portal solutions is typically done by system integrators with great time and expense because of complex coding and database interaction required.

A conventional voice portal solution is simply a fixed, finite, static and unchanging vocabulary of words programmed into the voice portal at the time it was implemented with corresponding fixed, finite, static and unchanging links to sources of information. The links remain static. The information is the only part of the system that changes. The present invention solves these problems of conventional voice portals by providing a voice portal with the following features:

1. The ability to bridge the gap between a conventional web browser and the strictly audio world;

2. The ability to allow precise searching; and

3. The ability for the user to refer to the most complex search with a single spoken word, or audio macro with extremely high accuracy.

The present invention differs in operation from a conventional voice portal by a unique organization of programs and data. Specifically the present invention provides a unique data structure, which will be referred to herein as a "topic template", which includes but is not limited to primarily a user-defined word or "topic", user-defined associated source information or "topic coupling", user-defined temporal information or "topic temporal information", and user-defined action via a user-specified audio macro. The present invention allows the creation of this topic template in real-time. The present invention then enables access to the topic template via a graphic/voice user interface (G/VUI) to the topic radio tuner where the audio macros (grammar for that session) are interpreted into their corresponding topic actions yielding:

1. A system and method for the real-time end user creation of a voice portal;

2. A system and method for the real-time creation of a unique voice portal per user in a multi-user environment; and 3. A system and method whereby the construct of a "topic" is used to enable a more efficient voice portal navigation paradigm as compared to conventional voice portal implementations.

The present invention achieves these goals via a two-pass approach whose base construct is user-defined topics. The first pass is the creation of user-definable voice portals. The second pass is access to information using the user-defined voice portals and real-time end user modification of the end user's personal voice portal.

According to another aspect, the present invention includes a software interface, which will be referred to herein a personal broadcast editor, which enables end user creation and modification of voice portals. There are three primary areas where the functionality of the personal broadcast editor differs greatly from conventional voice portals:

1. The ability for the user to define in real-time an arbitrary vocabulary word or phrase, that is referred to herein as an audio macro. The set of audio macros for a particular user define the grammar that must be interpreted by the speech recognition engine when providing a voice portal to that user.
2. The ability to couple the vocabulary word or audio macro to an arbitrary content source in real-time via Web technologies
3. The ability to define in real-time the enunciation of the topic (i.e. one user may say "tom-A-to" ... another user may say "tom-ah-to", etc.).

DEFINITIONS

Personal Broadcasting Suite

The personal broadcasting suite provides a common interface for generating a personal voice portal for each listener (user). The resulting voice portal provides a common yet customized presentation to listeners. It is comprised of a login module, personal broadcast editor, universal Interface (G/VUI—Graphical/Voice User Interface), and a topic radio tuner.

The personal broadcasting suite is a 2-pass system, but may include more than two passes. The personal broadcasting suite begins with setting up general registration, keywords, audio macros and a template. The second pass, when a listener accesses their unique portal through the topic radio tuner, delivers the requested personalized information in a device independent manner (phone, hands-free mobile phone, telematics, etc.).

Audio Macro

Audio macros are the words the listener assigns to access either a specific source or piece of information or multiple sources or pieces of information with due regard to the associated reference source, full-text search, and temporal information. Audio macros are similar to bookmarks in a 2D environment and assigned by the listener to access either a specific source or a piece of information or multiple sources of information with due regard to the associated temporal information. They are not finite and static as in other systems, but may be dynamic and infinite. The audio macros create a unique grammar set for that listener and the template in use. Again, grammar is the set of vocabulary words or audio macros that speech recognition hardware and software must recognize for a particular user. The system offers dynamic grammar loading so that the task of speech recognition is much easier than fixed grammar sets. Dynamic grammar loading refers to the loading of all of the particular audio macros for a particular user for a particular session. It is also easier for the user to remember his/her own macros and it is easier for the speech recognition technology to use a smaller set of unique grammar.

Login Module

The login module has a registration component for first time listeners to provide basic set-up information. Accessed via any suitable user interface, such as the Internet for sophisticated computer users or an 800 number for those with out computer/internet familiarity, the module acts as a conduit for collecting data such as name, address, phone number, PIN number, voice authentication, fingerprint or other ID number, email addresses (home, work, groups), fax number, GPS, and other basic information. Once the user is registered, the user may just log in.

Personal Broadcast Editor

The personal broadcast editor is a template-based approach to allow the listener to dynamically define in real-time the following:

Define/Edit targets (sources) of information;

Define/Edit actions including full text searching in the temporal domain;

Establish a link between the targets and actions; and

Define/Edit audio macros and pronunciation if required;

When accessed via an 800 number, a trained operator simply executes the personal broadcast editor to reflect the users requests. The output of the personal broadcast editor is a custom voice portal unique to that user.

Topic Radio Tuner

The topic radio tuner is the engine that begins to operate when the user calls in to access their personal voice portal. It is the actual navigational structure the user utilizes to retrieve topics via the audio macros they have previously assigned. The topic radio tuner facilitates one of the personal broadcasting suite's most valuable and unique attributes. In conventional systems where keywords are generic for all listeners, a specific topic radio audio macro is unique to that listener and the information set retrieved.

For example, in other systems, all the keywords and topics are known in advance and finite. In those systems, the listener has no ability to add the word "gizmo" in some profile/template and then speak it later. In our system they can, and furthermore they can in multiple languages (English, Spanish, etc.).

G/VUI Universal Interface

The G/VUI universal interface is a graphic user interface (GUI) coupled with a Voice User Interface (VUI) and provides a means to access the topic radio tuner and begin accessing your information. The term "universal" is used because it can be used through an suitable user interfaces device, such as a computer, a mobile phone, a landline phone, interactive television, or a VoIP device, and provides a standardized methodology for using new and evolving devices. The G/VUI can also provide a method for a user to define a user-specified homogeneous audio macro for accessing other voice portals with different grammar sets.

Accordingly, it is an object of the invention to overcome at least some of the difficulties associated with conventional voice portals and voice portal creation techniques.

An object of the invention having been stated hereinabove, other objects will become evident as the description proceeds when taken in connection with the accompanying drawings as best described hereinbelow.

BRIEF DESCRIPTION OF THE DRAWINGS

Preferred embodiments of the present invention will now be explained with reference to the accompanying drawings, of which.

DETAILED DESCRIPTION OF THE INVENTION

Figure 1:
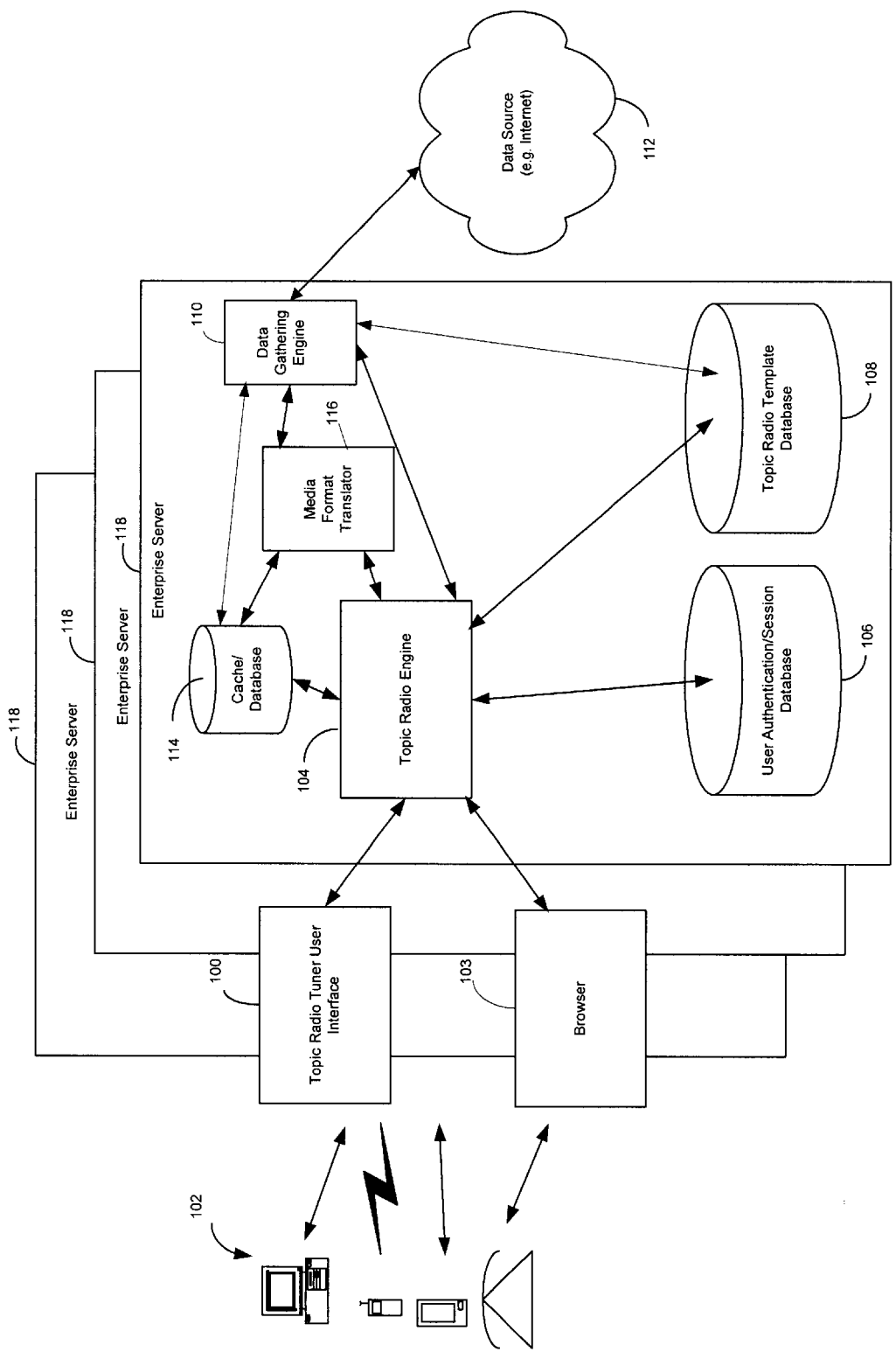
FIG. 1 is a block diagram of an exemplary system architecture for generating and providing access to unique per-user voice portals in a multi-user environment according to an embodiment of the present invention.

Referring to FIG. 1, a system for generating and providing access to end user definable voice portals according to an embodiment of the present invention includes a variety of modules implemented in hardware, software, firmware, or any combination thereof, that cooperate to achieve the goals of end user generation, modification, and access to voice portals. In particular, the system includes topic radio tuner user interface 100 that allows end users to generate, access, and modify their own voice portals via a variety of user input devices 102, such as POTS telephones, mobile telephones, personal computers, personal digital assistants, and interactive television interfaces. During the voice portal generation or modification phase, topic ratio tuner user interface 100 may receive input from the user as to data sources, keywords, audio macros, etc., for creating the voice portal. During the voice portal activation phase, a browser 103 may allow the user to navigate the voice portal using speech commands. Browser 103 may be an audio browser, a visual browser, or a combination audio/visual browser.

Topic radio engine 104 is a module that controls the overall operation of the system. For example, when a user accesses topic radio tuner user interface 100 for the first time, topic radio engine 104 may present a registration screen to the user, and store information regarding the user in user authentication/session database 106. During user registration, topic radio engine 104 preferably assigns a unique identifier to the user, which will be used to identify and access that user's voice portal. The next time the user accesses topic radio tuner user interface 100, topic radio engine 104 may access user authentication/session database 106 to authenticate the user.

According to an important aspect of the invention, topic radio engine 104 presents one or more templates to each user to collect information from the user regarding information sources, search keywords, search time windows, and audio macros for accessing search results. In the illustrated embodiment, these templates are stored in topic radio template database 108. The particular template presented to an individual user may depend on the type of user. For example, if the user is a cardiologist, the template may contain lists of medical journals from which information may be extracted. Alternatively or in addition to user-tailored templates, users may be presented with generic templates, such as news templates, weather templates, sports templates, etc., that allow users to define audio macros and data sources for these categories of information. In another example, if the user is an individual investor, the template may contain stock information and allow the user to select stock information to be included in his or her voice portal. If the user is a company, the template may allow the user to select from information provided on the company's web site. Once the user completes the templates, the template is stored in topic radio template database 108 and used in providing a unique voice portal for a particular user.

Topic radio engine 104 uses the data entered by the user in the user's template to create a unique voice portal for that user. For example, topic radio engine 104 may convert data entered by the user into a voice extensible markup language (VoiceXML) document. Audio macros entered by the user may be converted into VoiceXML grammar. The VoiceXML grammar may then be used by data gathering engine 110 to extract information from data source 112. Data gathering engine 110 may be any type of search engine capable of searching for data based on keywords provided by the user and extracting search results from the data source. For example, if data source 112 is the Internet, data gathering engine may be an Internet search engine, that searches Internet web pages using HTML tags and retrieves files by sending HTTP GET requests to the associated web servers. In a preferred embodiment of the invention, data gathering engine 110 continuously stores data extracted from data source 112 in a cache/database 114 for fast access when a user desires to access his or her individual voice portal.

The information retrieved from data source 112 is preferably converted into a user-specified format, such as audible format, text format, or other format, by media format translator 116 before being stored in cache/database 114. Alternatively, the information retrieved from data source 112 may be stored in its original format and converted to the user-specified format when a user accesses that user's voice portal. Media format translator 116 comprises a module that converts data from one medium or format to another medium or format. For example, media format translator 116 may convert a scanned document from .pdf or .gif image into a text file or a wave audio file. Media format translator 116 may convert user input, such as user speech, combinations of user-entered text and speech, DTMF digits, etc., into a format, such as text format, suitable for searching data source 112. Media format translator 116 may also convert information received from data source 112 into the user-specified format, such as digitized speech format to be played back to the user.

In one embodiment, media format translator 116 may comprise a text-to-speech/speech-to-text converter. Exemplary commercially available text-to-speech/speech-to-text engines suitable for use with embodiments of the present invention include the SPEECHWORKS® software available from Speechworks International Corporation or the NUANCE 7.0 software available from Nuance Communications, Inc. Any suitable text-to-speech/speech-to-text engine is intended to be within the scope of the invention.

When a user accesses his or her voice portal, session database 106 maintains a context for the user. For example, session database 106 may store state information indicating where the user is in a particular voice portal in order to allow the user to return to that location should the user so desire.

The modules and databases illustrated in FIG. 1 may execute on any suitable hardware platform. In a preferred embodiment, the hardware platform comprises one or more enterprise servers 118. Enterprise servers suitable for use with embodiments of the present invention include the Enterprise 220 or 440 servers available from SUN Microsystems and the RISC 6000 available from IBM Corporation.

Figure 2:
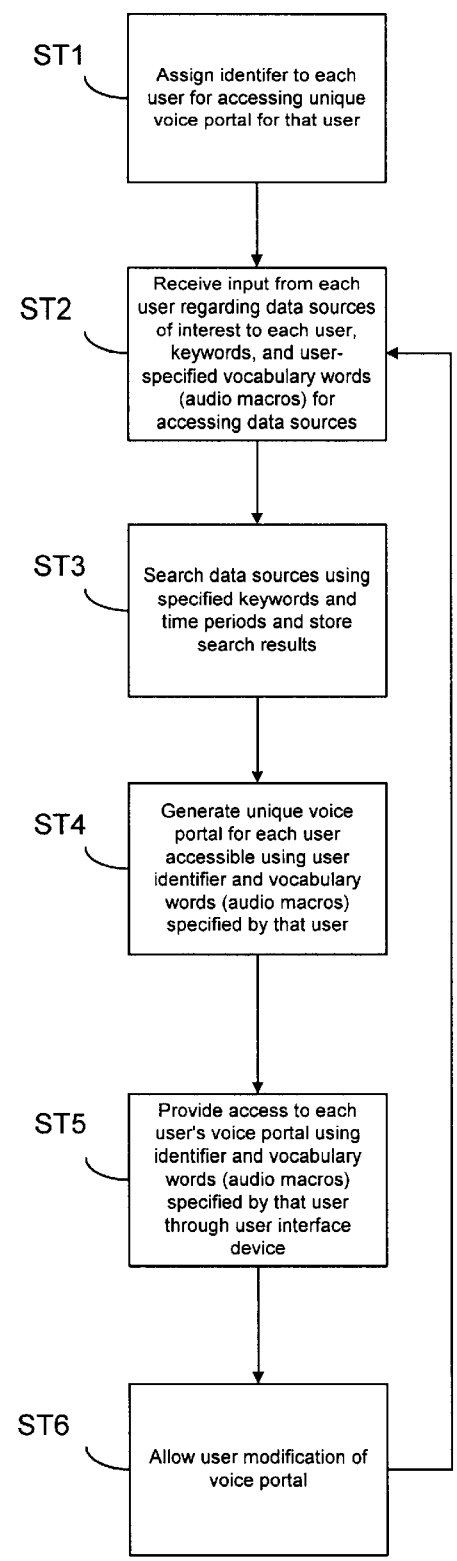
FIG. 2 is a flow chart illustrating exemplary steps associated with a method for generating and providing access to unique per-user voice portals in a multi-user environment according to an embodiment of the present invention.

FIG. 2 is a flow chart illustrating the overall process flow of the methods and systems for generating and providing access to user-definable voice portals according to an embodiment of the present invention. In FIG. 2, in step ST1, when a user desires to create a voice portal, the user accesses topic radio tuner user interface 100 and topic radio engine 104 assigns the user a unique identifier. This identifier is important because it identifies the user and associates the user with a voice portal. The identifier may be any suitable identifier for uniquely identifying the user. For example, the identifier may be a number or combination of characters selected by the user or generated by the system. In an alternative embodiment, the systems for generating and providing user access to voice portals may use biometric identification methods, such as a voice signature, a fingerprint, retinal scan, or any other suitable identifier for uniquely identifying the user.

Once an identifier has been assigned to the user, in step ST2, topic radio engine 104 extracts, based on the identifier, a template from template database 108 which prompts the user for data sources, keywords for searching the data sources, time intervals of interest for the searches, and vocabulary words or grammar associated with the information. This step allows the user to select not only the data sources that are of interest to the user, but also a word or phrase (the audio macro) that is easy for the user to remember in order to access the data sources. For example, a cardiologist may choose "heart" as the vocabulary word or audio macro to be spoken in order to access all articles in the last three months on the New England Journal of Medicine on angiogenesis. The user may associate different vocabulary words with different data sources. For example the user may select "portfolio" to access stock quotes for stocks in the user's stock portfolio. Because each user defines an individual voice portal, if there are one million or more users, the users can define the same audio macro "heart" and associate the audio macro with one million different data sources.

Unlike conventional interactive voice systems, the user is not limited to a predefined set of words or information. The reason that the user can select any vocabulary word for accessing information is that the system generates a unique voice portal per user. Since a user defines the vocabulary words associated with the voice portal, the set or dictionary of vocabulary words associated with the voice portal is finite for the user. As a result, system hardware and/or software for interpreting spoken vocabulary words from each user is not likely to become confused between different users' pronunciations of words.

The ability to for a user to specify his or her own grammar for accessing a voice portal and data sources to be associated with the voice portal allows the user to create a voice portal that provides homogeneous access to heterogeneous voice portals provided by other companies. For example, the user may specify "portfolio" as the audio macro for accessing stock quotes. The user may specify a variety of different voice portals as data sources to be associated with the "portfolio" audio macro. Once conventional voice portal that provides such quotes can be accessed through www-.tellme.com. Another voice portal that provides stock quotes can be accessed through www.heyAnita.com. Each of these voice portals has different grammar for accessing stock quotes. Topic radio engine 104 according to an embodiment of the present invention allows the user to specify his or her own unique audio macro for accessing both conventional voice portals, thus eliminating the need for remembering voice-portal-specific grammar.

To illustrate the concept and advantages of a unique voice portal per user, the following tables respectfully illustrate audio macro and data associations for two users, user A and user B:

TABLE 1

Grammar and Data Associations for User A

| Audio Macro | User Pronunciation | Data Source |
| --- | --- | --- |
| Tomato | to MAY to | USDA tomato crop reports |
| Sports | — | goDuke.com |
| Stock market | — | cnn.com |

TABLE 2

Grammar and Data Associations for User B

| Audio Macro | User Pronunciation | Data Source |
| --- | --- | --- |
| Tomato | to MAH to | USDA tomato crop reports |
| Sports | — | goheels.com |
| Market Quotes | — | cnn.com |

The first rows of Tables 1 and 2 illustrate the condition of two users selecting the same audio macro but pronounce the word differently. For example, user A says "to MAY to" and user B says "to MAH to". The system for providing user access to the associated voice portal is capable of processing both of these vocabulary words without confusion to access the correct data source for each user because the vocabulary words are selected and stored on a per user basis.

The second rows of Tables 1 and 2 illustrate the condition of two users defining the same vocabulary word "sports" to access different data sources. For example, when user A says "sports", user A wants to hear information from goDuke.com and user B may want to hear information from goheels.com. Again, because the voice portals are created on a per user basis, the system allows different users to select the same vocabulary words and different data sources and is capable of efficiently processing requests for information from the different sources.

The third rows in Tables 1 and 2 are intended to illustrate the condition where user A and user B choose different vocabulary words to access the same data source. In the illustrated example, user A says "stock market" to access market quotes from cnn.com. User B says "market quotes" to access information from the same source. Because voice portals are created and stored on a per user basis, different vocabulary words can be selected by each user to access the same data source.

Referring back to FIG. 2, once a user has selected vocabulary words or audio macros, data sources, and time intervals, in step ST3, topic radio engine 104 stores this information in database 108 and provides the data source, keyword, and time information to data gathering engine 110, which searches the specified data sources using the specified keywords and stores the results in cache/database 114. Storing the user-specified audio macros, data sources, keywords, and temporal information in database 108 and pre-fetching the information requested by that user effectively creates a unique voice portal per user (step ST4). Searching the user-specified data sources may be performed continuously or periodically to decrease access time when the user seeks to access the information via the user's voice portal. In addition, because the searching only occurs in the user-specified data sources, the level of detail in a search can be increased. For example, a user may select IEEE Spectrum magazine as a data source. Because the search space is limited, the level of detail is increased. In this example, full text searching of the articles in IEEE Spectrum magazine could be accomplished without an undue burden on system resources because the search space is limited. Such full text searching is not feasible in conventional voice portals that utilize the entire Internet as the data source being searched when a user enters a request.

Once the search results have been cached or stored in a database, topic radio engine 104 is prepared to serve the information to the user. In step ST5, topic radio engine 104 provides access to the unique voice portal per user via a user interface device, such as a telephone (landline or mobile), a personal digital assistant (PDA), a personal computer, or any other form of user interface device. The user may utilize the vocabulary word or vocabulary words defined by that user to access the user's data sources. This greatly facilitates an individual's ability to access information. In addition, if a user desires to save information for later listening, the user may utter a predetermined keyword, such as "save", and the message may be saved in any suitable format for later access, such as a .WAV file or a text file, and sent to the user's email account or other location, such as the user's PDA, fax machine, etc., for later listening or access.

In step ST6, topic radio engine 104 allows the user to modify the voice portal to change the voice portal that has been previously generated for the user by repeating steps ST2–ST5. The steps illustrated in FIG. 2 may be repeated by each user in a multi-user system to generate unique per-user voice portals having user-specified data sources, search keywords, time periods, and grammar.

Figure 3:
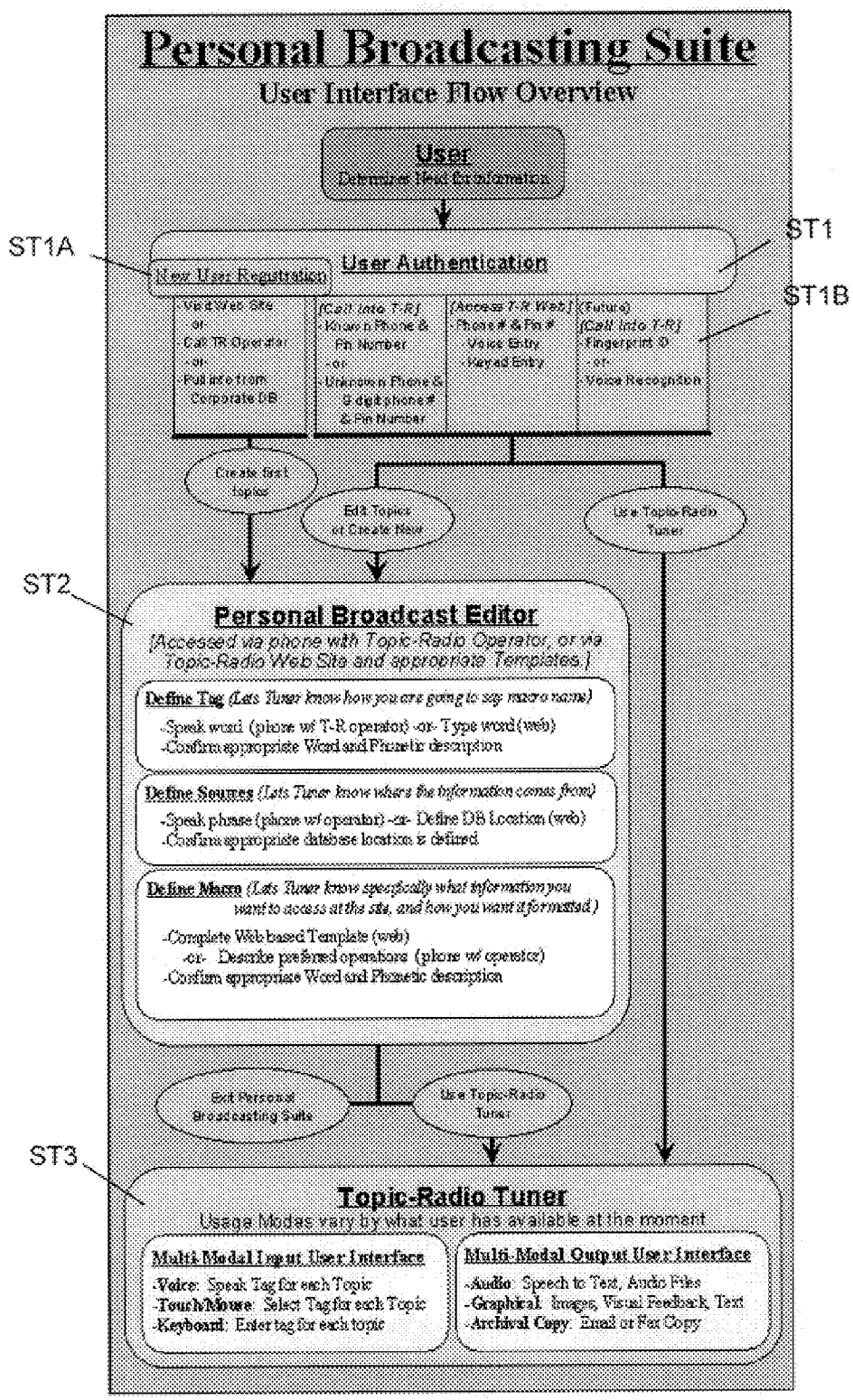
FIG. 3 is a flow chart illustrating exemplary user interface flow associated with the methods and systems for generating and providing access to unique per-user voice portal in a multi-user environment according to embodiments of the present invention.

FIG. 3 is a flow diagram illustrating the overall user interface flow for creating, accessing and modifying a user-defined voice portal according to an embodiment of the present invention. In step ST1, topic radio engine 104 presents the user with a user authentication interface whether the user is generating a voice portal for the first time, accessing a previously created voice portal, or modifying a previously created voice portal. If the user is generating a voice portal for the first time, the user may be presented with a user registration interface in step ST1A that requires the user to input or select a user identifier to be associated with that user's voice portal. In step ST1B, topic radio engine 104 performs authentication on the user depending on the method used to access topic radio engine 104. For example, if the user is accessing topic radio engine 104 via a telephone, topic radio engine may require the user to speak or key in a pin number. Alternative authentication methods include caller ID (provided by PSTN calling name (CNAM) service, biometric identification, such as voice recognition, fingerprint recognition, or any other suitable authentication technique.

If the user is accessing topic radio engine 104 for the first time, or if the user is creating a new template or editing an existing template, in step ST2 topic radio engine 104 presents the user with a series of templates, which are collectively referred to as the personal broadcast editor. These templates allow the user to enter audio macros, define data sources, and keywords and time periods for accessing the data sources.

Once the user completes the templates provided by the personal broadcast editor, the user either exits the personal broadcast editor or accesses topic radio tuner 100 (step ST3). The access method can be a mobile telephone, a POTS telephone, or any other end user device for entering speech commands, text commands, or combination of text and speech commands. The input provided back to the user is preferably in audible format, but can be in text format, video format, and/or graphical format. If the user desires to save information provided in audible for later listening, the user may say "save" into the user interface device and the information will be saved to a medium selected by the user, such as a .wav file attached to the user's email account, a text file, etc.

Figure 4:
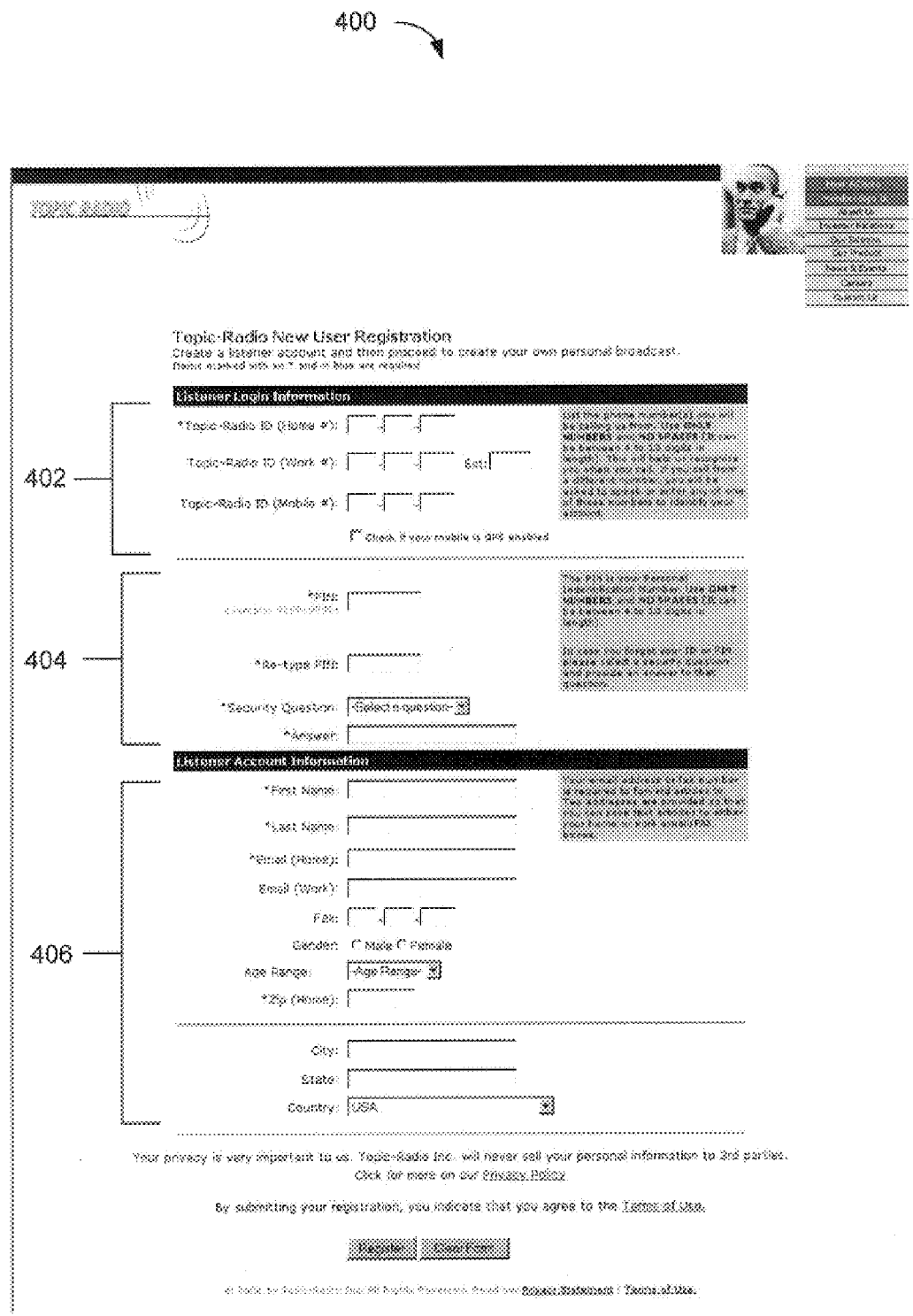
FIG. 4 is a computer monitor screen shot of a user registration screen associated with the methods and systems for generating and providing access to unique per-user voice portals in a multi-user environment according to embodiments of the present invention.

FIG. 4 is an example of a registration screen 400 that may be generated by topic radio engine 104 according to an embodiment of the present invention. Registration screen 400 may be an HTML file served by web server software resident on enterprise server 108 illustrated in FIG. 1. In FIG. 4, registration screen 400 includes first user input cells 402 for receiving the user's telephone numbers. User input cells 404 require the user to select a personal identification number and a security question. Input cells 406 require the user to input account information, such as the user's name, address, email address, etc. Once the user has completed registration screen 400, the user clicks on "Register" and the registration information is provided to topic radio engine 104. Topic radio engine 104 may use some of the information input in registration 404 to generate unique identifier, a user id, and a password for the user. Topic radio engine 104 may then send the user id and the password to the user's email address or some other location specified by the user.

Figure 5:
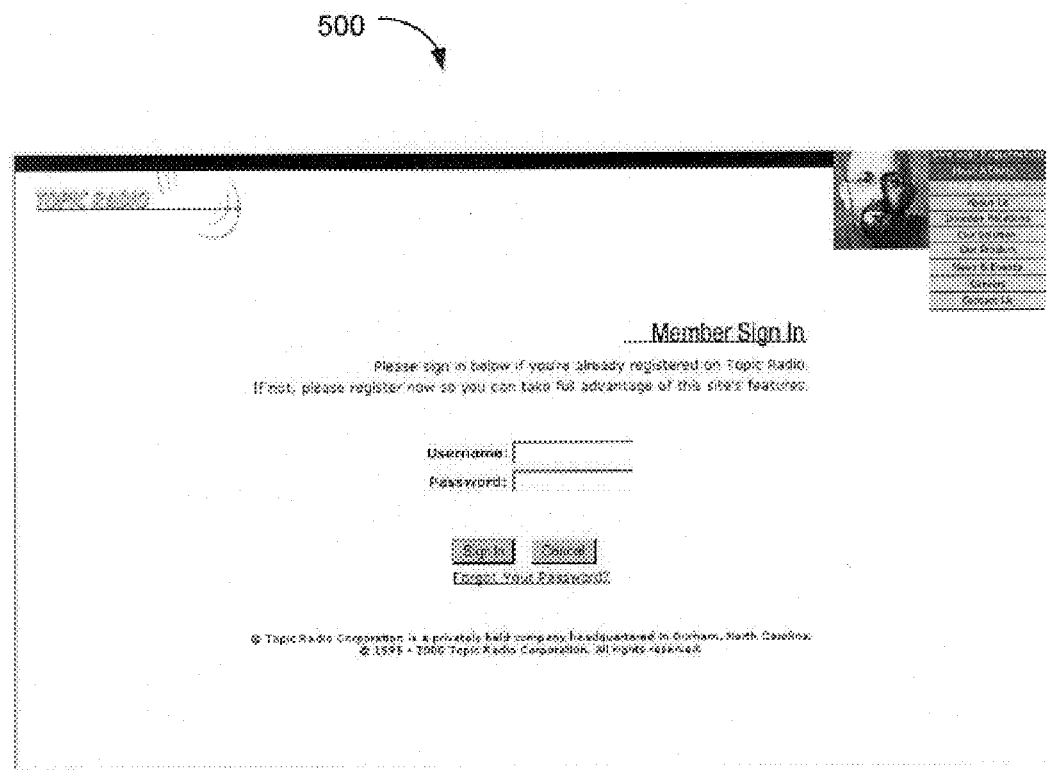
FIG. 5 is a computer monitor screen shot of a user login screen associated with the methods and systems for generating and providing access to unique per-user voice portals in a multi-user environment according to embodiments of the present invention.

Once the user has successfully registered, the user can create a user-specified voice portal by logging into the server that provides access to topic radio engine 104. FIG. 5 is an example of a login screen 500 provided by topic radio engine 104 according to an embodiment of the present invention. Login screen 500 illustrated in FIG. 5 may be an HTML file served by a web server, such as enterprise server 108 illustrated in FIG. 1. The user may input the username and password provided by topic radio engine 104 when the user completed and submitted registration screen 400.

Figure 6:
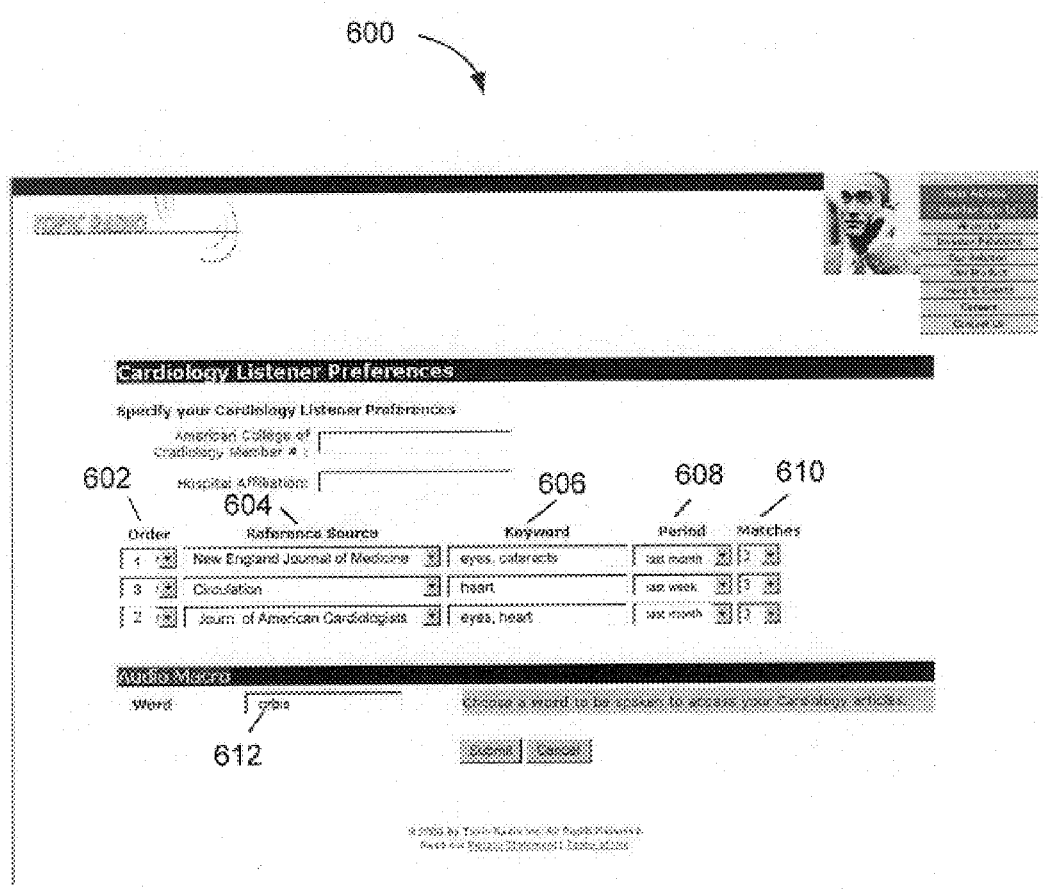
FIG. 6 is a computer monitor screen shot of an individual voice portal template associated with the methods and systems for generating and providing access to unique per-user voice portals in a multi-user environment according to embodiments of the present invention.

Once the user has successfully registered and logged into the system, topic radio engine 104 may present the user with a series of templates that allows the user to create a unique voice portal for that user. FIG. 6 is an example of a template that may be presented to a cardiologist. In FIG. 6, template 600 includes a first set of input cells 602 that allow the user to select the order in which searches will be presented in his or her voice portal. Input cells 604 allow the user to input the reference source. Input cells 604 may either include pulldown menus of available reference sources or may allow the user to manually enter a reference source. In the illustrated example, the user has selected the New England Journal of Medicine, Circulation, and the Journal of American Cardiologists. Input cells 606 allow the user to select keywords for searching articles in each source. Input cells 608 allow the user to input a time period for searching each source. For example, if the reference source is a monthly journal, the user may select the last month as a time for performing the search. Finally, input cells 610 allow the user to select a maximum number of matches that will be retrieved from each reference source.

According to an important aspect of the invention input cell 612 allows the user to select a word or audio macro for accessing the reference source. The word may be any word that helps the user remember the data being accessed. In the illustrated example, the user selects the word "orbis". Once the user has completed all of the fields in template 600, the user clicks "submit" and topic radio engine 104 creates a unique voice portal for that user. More particularly, referring back to FIG. 1, topic radio engine 104 stores a template for the user in topic radio template database 108 and data gathering engine 110 to start gathering the requested information for the user. Data gathering engine 110 gathers the requested information from the specified data source. Media format translator 116 may convert the requested information into audio format and the information may be stored in cache/database 114. Alternatively, the information may be stored in text format and converted when the user requests the information.

Once the template has been created, the user can access the voice portal, for example by dialing a predetermined number on a mobile phone, speaking or keying in a password, and speaking the word "orbis". Topic radio engine 104 extracts the information for that user from cache/database 114 and plays the requested information for that user. Because the information is cached or stored in a database, the lag associated with information retrieval is minimal as compared to conventional voice portals that are not unique per user. In addition, because the user can utilize the user's own word, rather than a predefined word from a list, the user is more likely to remember how the access the requested information.

Figure 7:
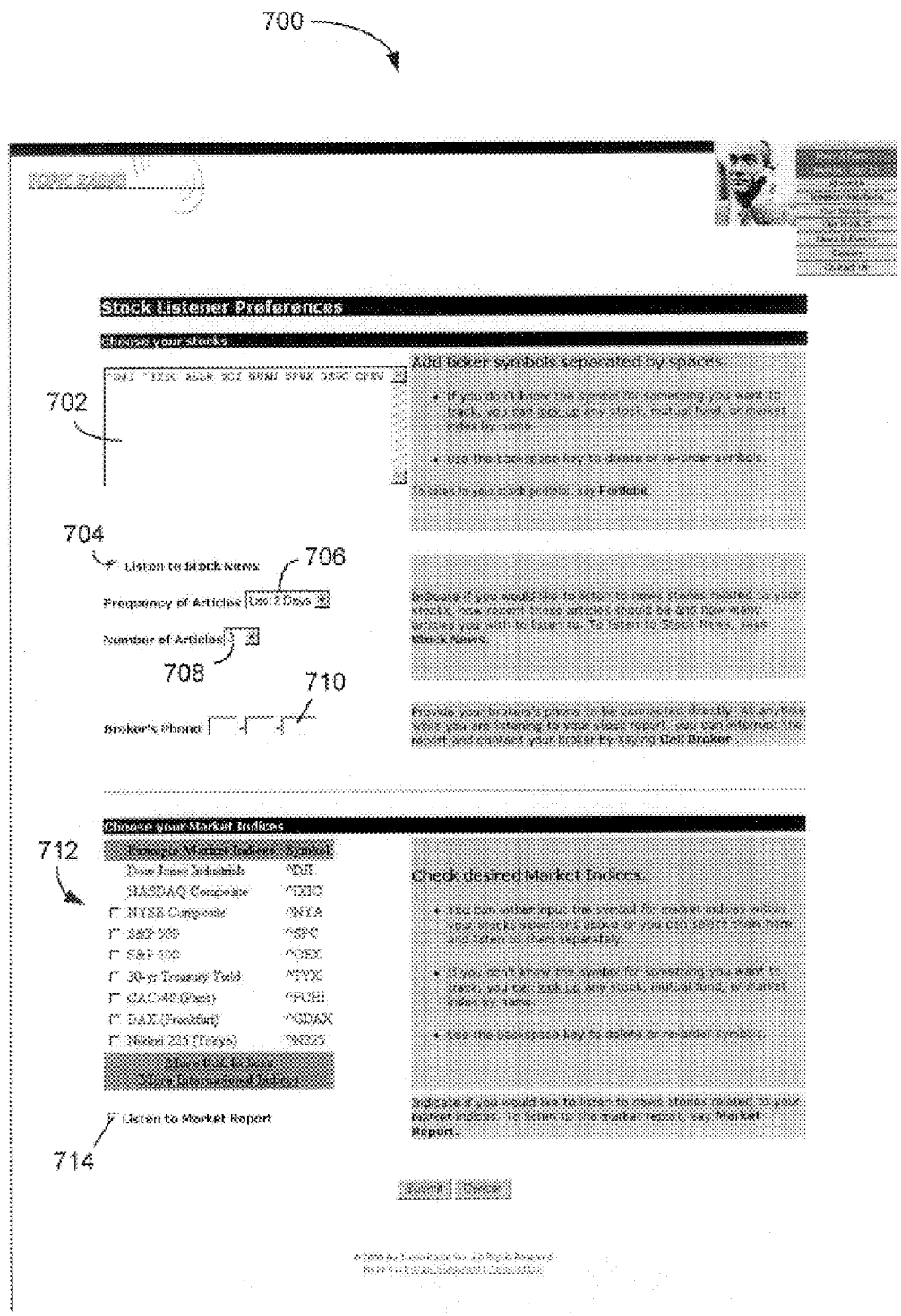
FIG. 7 is a computer monitor screen shot of another individual voice portal template associated with the methods and systems for generating and providing access to unique per-user voice portals in a multi-user environment according to embodiments of the present invention.

FIG. 7 is an example of a template 700 that may be present to a user interested in creating an individualized voice portal for that user's stock quotes. In the illustrated embodiment, template 700 includes a first user input area 702 that allows the user to input stocks that are of interest to the user. Input cell 704 allows the user to select whether the user desires to news relating to stocks that the user selected in input area 702. Input cells 706 and 708 allow the user to select the time period for listening to the stock news and the number of articles to which the user desires to listen. Input cell 710 allows the user to input the user's stockbroker's telephone number. Data entered in this cell is used by topic radio engine 104 to contact the user's broker directly in response to receiving a voice command from the user, such as "contact broker." Input cells 712 allow the user to select stock indices, such as S&P 500 that are of interest to the user. Finally, input cell 714 allows the user to select whether the user desires to listen to news regarding the selected stock indices.

Once the user has completed template 700, the user clicks "submit" and a unique voice portal is created for the user in the manner described above. Using such a voice portal, the user can listen to both current and prior information regarding the user's stock portfolio, listen to stock news, and contact the user's broker directly. Unlike conventional voice portals that must search through every stock symbol when responding to a particular user's spoken request, the voice portal created using template 700 need only recognize a user's spoken request in the context of that user's preferred stocks, in addition, because the extracted stock information is extracted when the voice portal is created and continuously updated, the time for responding to a user's request is decreased over conventional voice portals, such as tellme.com.

Another advantage to an individual voice portal according to an embodiment of the present invention with regard to stock quotes is the ability to access past stock information for comparative analysis by the user. Because input cell 706 allows the user to select the time period for accessing company information, such a time period can include past information, e.g., the stock price or stock news for each day over the last month. Such temporal information may be extremely useful to an investor in determining whether to purchase or sell a particular stock.

Figure 8:
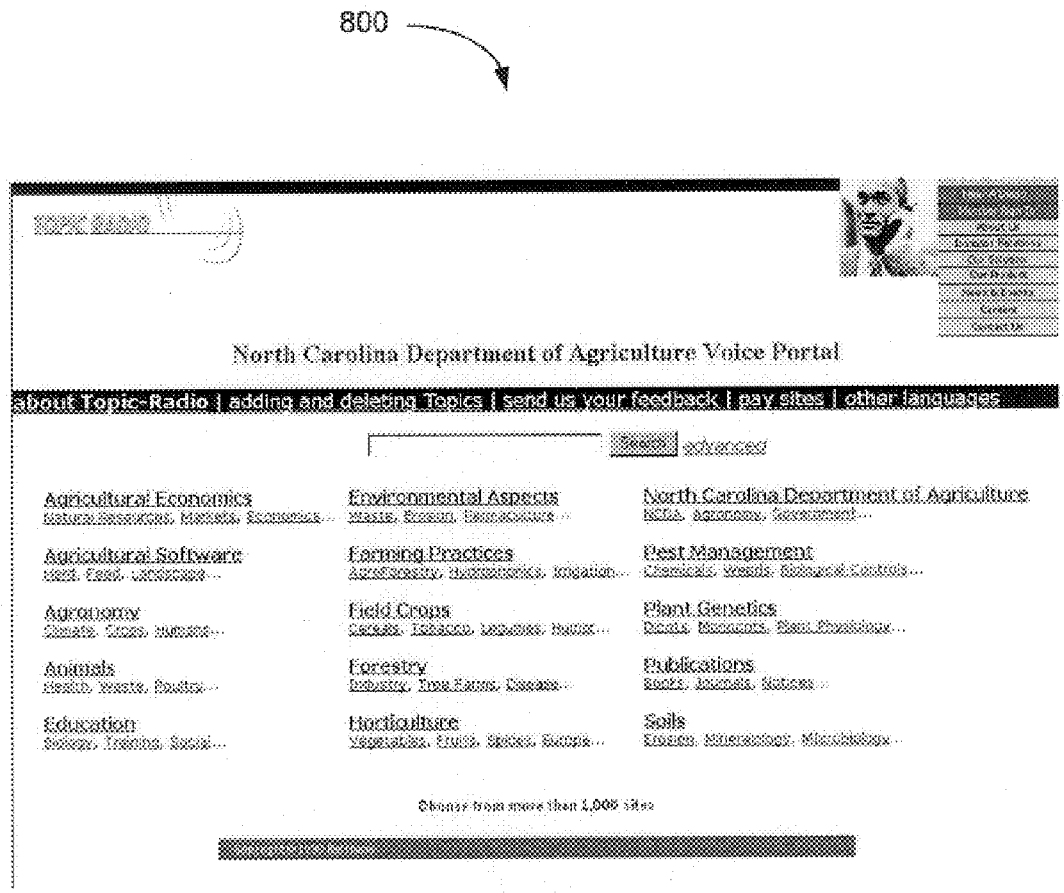
FIG. 8 is a computer monitor screen shot of another individual voice portal template associated with the methods and systems for generating and providing access to unique per-user voice portals in a multi-user environment according to embodiments of the present invention.

FIG. 8 illustrates an example of a template 800 designed for creating a group voice portal, i.e., a voice portal tailored for a group of users that desire to access similar information. In the example illustrated in FIG. 8, template 800 contains topics of interest to employees of the North Carolina Department of Agriculture. Employees can create their own individual voice portals using template 800 by selecting topics and saving the results. Alternatively, all users of a group voice portal may be given access to the same information and an administrator may add or delete topics to the group voice portal.

FIGS. 6–8 merely illustrate example of templates by which users can create their own voice portals. The present invention is not intended to be limited to these examples. Any template for creating a user-specific voice portal is intended to be within the scope of the invention.

One advantage of the present invention is that individualized voice portals can be created in real time by non-sophisticated end users without the need for specialized programming knowledge. Conventional voice portals require skilled technicians or engineers for voice portal creation and modification. Thus, the present invention greatly simplifies the voice portal creation and modification process.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for generating and providing access to unique per-user voice portals in a multi-user environment, the method comprising:

(a) providing a series of topic templates to a voice portal end user for allowing the end user to define, in real time, a unique voice portal for the end user, the voice portal linking end-user-defined vocabulary words with searches of end-user-selected data sources using end-user-selected keywords and end-user-selected time periods and providing access to search results in an end-user-selected format, wherein at least one of the topic templates is tailored to a particular type of end user and includes fields for receiving user input to select the data sources, keywords, and time periods associated with the particular end user type;

(b) assigning an identifier to the end user for accessing the voice portal;

(c) receiving, via the topic templates, a first input from the end user regarding the end-user-defined vocabulary word for accessing the voice portal;

(d) receiving, via the topic templates, a second input from the end user regarding the end-user-specified data source to be searched;

(e) receiving, via the topic templates, a third input from the first end user regarding the keywords for searching the end-user-specified data source;

(f) receiving a fourth input from the end user regarding the time period for searching the data source;

(g) searching, in advance of receiving the vocabulary word from the end user, the end-user-specified data source using the keywords and the time period and storing the search results;

(h) creating, in real time, the unique voice portal for the end user that provides access to the stored search results in the end-user-specified format;

(i) providing access to the voice portal in response to receiving the identifier and the end-user-specified vocabulary word from the end user through an end user device; and (j) repeating steps (a)–(i) for each end user in the multi-user system to create, store and provide access to a unique voice portal per user.

2. The method of claim 1 wherein the end-user-specified format comprises audible format.

3. The method of claim 1 wherein the end-user-specified format comprises visual format.

4. The method of claim 1 wherein the end-user-specified format comprises a combination of audible and visual format.

5. The method of claim 1 wherein assigning an identifier to the end user includes assigning a number to the end user.

6. The method of claim 1 wherein assigning an identifier to the end user includes assigning a biometric identifier to the end user.

7. The method of claim 1 wherein receiving the first through fourth inputs includes receiving the first through fourth inputs from each user via a graphical user interface.

8. The method of claim 1 wherein searching the end-user-specified data source includes periodically searching the end-user-specified data source.

9. The method of claim 8 wherein storing the search results includes storing the search results from each iteration of the search.

10. The method of claim 9 wherein providing access to the voice portal includes providing access to the stored search results in response to receiving the end-user-specified vocabulary word.

11. The method of claim 1 wherein the end-user-specified data source is a periodical and wherein searching the end-user-specified data source includes full-text searching editions of the periodical specified by the time period received from the user.

12. The method of claim 1 wherein the end user device comprises a telephone.

13. The method of claim 12 wherein the telephone comprises a mobile telephone.

14. The method of claim 1 wherein the end user device comprises a personal digital assistant.

15. The method of claim 1 wherein the end user device comprises a personal computer.

16. The method of claim 1 comprising receiving a plurality of end-user-specified vocabulary words for each end-user and wherein providing access to the voice portal in response to receiving the end-user-specified vocabulary word comprises providing access to each end-user's voice portal using only that user's specified vocabulary words.

17. The method of claim 1 comprising allowing each end user to modify at least one of: the data sources, the keywords, and the vocabulary words associated with that end user's unique voice portal.

18. The method of claim 1 wherein receiving the end-user-specified vocabulary word includes receiving the end-user-specified vocabulary word in audible format.

19. The method of claim 1 wherein receiving the end-user-specified vocabulary word includes receiving the user-specified vocabulary word in text format.

20. The method of claim 1 wherein receiving the end-user-specified vocabulary word includes receiving a first user-specified vocabulary word in audible format and a second user-specified vocabulary word in text format.

21. A method for generating and providing access to unique per-user voice portals in a multi-user environment, the method comprising:

(a) providing a series of topic templates to a voice portal end user for allowing the end user to define, in real time, a unique voice portal for the end user, the voice portal linking end-user-defined vocabulary words with searches of end-user-selected data sources using end-user-selected keywords and end-user-selected time periods and providing access to search results in an end-user-selected format, wherein at least one of the topic templates is tailored to a particular type of end user and includes fields for receiving user input to select the data sources, keywords, and time periods associated with the particular end user type:

(b) assigning identifiers to each end user in a multi-user system for accessing unique voice portals for each end user;

(c) receiving, via the topic templates, input from each end user regarding data sources of interest to each user, keywords for searching the data sources, time periods for searching the data sources, and end-user-specified vocabulary words for accessing the data sources;

(d) searching the data sources specified by each end user using the keywords and the time periods and storing the search results;

(e) generating, in real time, a unique voice portal for each end user that allows each user to access and navigate the search results using the vocabulary words specified by that end user; and (f) providing access for each end user to that end user's unique voice portal in response to receiving the identifier for that end user and one of that end user's vocabulary words through an end user device.

22. The method of claim 21 wherein assigning identifiers to each end user comprises assigning a number to each end user.

23. The method of claim 21 wherein assigning identifiers to each user comprising assigning a biometric identifier to each end user.

24. The method of claim 21 wherein receiving input from each end user includes receiving input from each user via a graphical user interface.

25. The method of claim 21 wherein searching the data sources comprises periodically searching the data sources and caching the search results for each end user.

26. The method of claim 21 wherein the data source is a periodical and searching the user-specified data source includes full-text searching editions of the periodical specified by the time period received from the end user.

27. The method of claim 21 wherein the end user device comprises a telephone.

28. The method of claim 27 wherein the telephone comprises a mobile telephone.

29. The method of claim 21 wherein the end user device comprises a personal digital assistant.

30. The method of claim 21 wherein the end user device comprises a personal computer.

31. The method of claim 21 comprising receiving a plurality of end-user-specified vocabulary words for each user and wherein providing access to the voice portal in response to receiving the end-user-specified vocabulary word comprises providing access to each end user's voice portal using only that end user's specified vocabulary words.

32. The method of claim 31 comprising allowing each end user to modify at least one of: the data sources, the keywords, and the vocabulary words associated with that user's unique voice portal.

33. A system for creating and providing access to a per-user voice portal in a multi-user environment, the system comprising:
(a) a user interface for providing a voice portal end user with a series of topic templates for creating, in real time, an individual voice portal for the end user, the topic templates including input cells for allowing the user to enter data sources, keywords and time intervals for searching the data sources, and an audio macro for accessing search results from the data source, the individual voice portal linking end-user-defined audio macros with searches of end-user-selected data sources using end-user-selected keywords and end-user-selected time periods and providing access to search results in an end-user-selected format, wherein at least one of the topic templates is tailored to a particular type of end user and includes fields for receiving user input to select the data sources, keywords, and time periods associated with the particular end user type;
(b) a search engine for receiving the data sources, time intervals, and keywords, input by the end user, extracting information from the data sources, and caching the requested information; and
(c) a topic radio engine for receiving the audio macro from the end user accessing the requested information, and for providing the information to the end user in audible format, thereby creating an individual voice portal for the end user.

34. The system of claim 33 wherein the end user interface comprises a series of hypertext markup language forms for receiving input from the end user.

35. The system of claim 33 wherein the user interface includes at least one topic template for allowing an end user to create an individual voice portal containing information extracted from journal articles of interest to the end user.

36. The system of claim 35 wherein the topic template includes input cells for receiving input from the end user with regard to keywords for searching the journal articles and time intervals for searching the journal articles.

37. The system of claim 33 wherein the user interface includes at least one topic template for allowing an end user to create an individual voice portal containing stock market information of interest to the end user.

38. The system of claim 37 wherein the topic template includes input cells for receiving individual stock identifiers and a time interval from the end user, wherein the topic radio engine generates an individual voice portal including stock market information during the selected time interval for each of the individual stock identifiers.

39. The system of claim 33 wherein the user interface includes a topic template containing information for creating a voice portal for a group of end users.

40. The system of claim 39 wherein the group of end users comprises employees of a company or members of an organization.

41. The system of claim 39 wherein the user interface allows the end user to specify an audio macro and to associate one or more conventional voice portals with the audio macro, wherein the topic radio engine provides homogeneous access to the conventional voice portal in response to receiving the end-user-defined audio macro.

42. A computer program product comprising computer-executable instructions embodied in a computer-readable medium for performing steps comprising:
(a) providing a series of topic templates to a voice Portal end user for allowing the end user to define, in real time, a unique voice Portal for the end user, the voice Portal linking end-user-defined vocabulary words with searches of end-user-selected data sources using end-user-selected keywords and end-user-selected time periods and providing access to search results in an end-user-selected format, wherein at least one of the topic templates is tailored to a particular type of end user and includes fields for receiving user input to select the data sources, keywords, and time periods associated with the particular end user type;
(b) assigning identifiers to each end user in a multi-user system for accessing unique voice portals for each end user;
(c) receiving, via the topic templates, input from each end user regarding data sources of interest to each user, keywords for searching the data sources, time periods for searching the data sources, and end-user-specified vocabulary words for accessing the data sources;
(d) searching the data sources specified by each end user using the keywords and the time periods and storing the search results;
(e) generating, in real time, a unique voice portal for each end user that allows each user to access and navigate the search results using the vocabulary words specified by that end user; and
(f) providing access for each end user to that end user's unique voice portal in response to receiving the identifier for that end user and one of that end user's vocabulary words through an end user device.

43. The computer program product of claim 42 wherein providing access for each end user includes allowing each user to save information from that end user's unique voice portal for later listening or examination.

44. A computer program product comprising computer-executable instructions embodied in a computer-readable medium for performing steps comprising:
(a) providing a series of topic templates to a voice portal end user for allowing the end user to define, in real time, a unique voice portal for the end user, the voice portal linking end-user-defined vocabulary words with searches of end-user-selected data sources using end-user-selected keywords and end-user-selected time periods and providing access to search results in an end-user-selected format, wherein at least one of the topic templates is tailored to a particular type of end user and includes fields for receiving user input to select the data sources, keywords, and time periods associated with the particular end user type;

(b) receiving, via the topic templates, input from the end user regarding data sources that the end user desires to access, a format for receiving information from the data sources, and a word or phrase for accessing and navigating the information retrieved from the data sources;

(c) generating, in real time, a unique voice portal for the end user that allows the end user to access and navigate the information using the word or phrase; and (d) repeating steps (a)–(c) for a plurality of end users and storing unique voice portals for each of the end users.

* * * * *